Patented Dec. 27, 1932

1,892,425

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

RAPID DRYING SYNTHETIC RESINS

No Drawing.  Application filed March 12, 1930. Serial No. 435,363.

This invention relates to synthetic resins, and more particularly to resins of the glyceride type.

Resins of the glyceride type, and particularly those prepared from a polyhydric alcohol, such as glycerol and dibasic acid, such as phthalic acid or anhydride and a fatty acid of high molecular weight of the stearic acid type have been described in a number of co-pending applications, among which there may be mentioned the following: Serial No. 240,491, filed December 17, 1927; Serial No. 279,216, filed May 19, 1928; Serial No. 281,375, filed May 28, 1928; and Serial No. 284,277, filed June 9, 1928, of which the present application is a continuation in part.

Desirable resins for employment particularly in coating compositions, and especially in conjunction with nitrocellulose to make lacquers, are illustrated by the stearic phthalic glyceride resin. Such resins may be prepared by heating a mixture of the required ingredients, such as stearic acid, phthalic anhydride and glycerol. Pure stearic acid may be utilized, or a commercial stearic acid consisting largely of a mixture of stearic and palmitic acids may be employed. Hydrogenated fats or their fatty acids may also be used. Although hydrogenated fats may be expected to possess a different constitution, for the purpose of the present invention, however, it will be convenient to include all such fats and fatty acids as those of the stearic acid type.

In the co-pending applications referred to above, there have been given in great detail methods of making reaction complexes from such components. Two types of products generally result which may be classified as (1) soft waxy bodies resembling paraffin wax and (2) true resins.

For example in Serial No. 240,941, the production of resins of the fat forming acid type produced from polyhydric alcohols, such as glycerol, polyglycerol and the like, organic acids, such as dibasic carboxylic acids, namely phthalic acid or anhydride and stearic acid, dihydroxy stearic acid, and particularly fat forming acids containing from 16 to 18 carbon atoms, including also the oil acids, such as lauric acid having 12 carbon atoms or more. The lower carbon organic acids employed in many cases with the fat forming acids are usually of a crystalline character, and include a wide range of acid bodies, such as citric, malic, maleic, succinic, tartaric, phthalic, benzoic, salicylic and other acids of a similar nature, as well as their anhydrides. This application is particularly directed to coating compositions containing such resins of the fat forming acid type with nitrocellulose.

Serial No. 279,216 is primarily directed to resins of the fat forming acid type, in which a hydrogenated oil or hydrogenated oil acid is utilized.

Serial No. 281,375 is particularly directed to compositions containing light stable fat forming acid resins, particularly those produced from stearic or stearic and palmitic acids. The production of complexes of the true resin type are more particularly illustrated in this application as compared with the softer wax bodies obtained by providing a higher percentage of stearic acid or other fat forming acid. The polyhydric alcohols employed include glycerol, the glycols, polyglycerols, glycol ether and the halohydrins as well as ethylene oxide or its derivatives, and the polyhydric alcohols possessing a greater number of hydroxyl groups such as mannitol and pentaerythritol. Of these bodies generically referred to as polyhydric alcohols and their derivatives, the glycerols tend to give the harder products, and are therefore particularly valuable in preparing the harder resins. As further set forth in this application, the monobasic acids, such as benzoic and salicylic acid may be employed particularly in conjunction with a dibasic acid, such as phthalic anhydride. The group of crystalline organic acids includes those of from 6 to 12 carbon atoms, which yield resins of higher melting point than the lower organic acids such as acetic. The crystalline acids may be referred to as intermediate carbon acids to distinguish from the fat forming acids having 12 or more carbon atoms, and usually 16 to 18, but such fat forming acids may also possess 20 to 22 carbon atoms in some cases. The fat forming acid reactant is preferably stearic or palmitic acid, or their anhydrides, either in substantially pure or commercial form. The commercial stearic acid is well suited for use in the production of the desired resins because of the joint inter-resinifying effect of the palmitic acid. Single, double or triple pressed stearic acid may be employed, depending upon the melting point and color desired. As a general rule, the more complete the pressing, the higher is the melting point of the resin obtained. Where light stability is important in the finished product, a well pressed stearic acid is desirable. It is also possible to use mixtures of stearic acid with other saturated acids, such as those obtained from cocoanut oil particularly. The hydrogenated oils offer mixed saturated acids of desirable qualities, desired stability, lightness of color in the finished resin, and other properties of value. Some of these, such as hydrogenated whale oil, afford saturated acids of more than 18 carbon atoms. The fat forming acid derivatives also include the estolide bodies formed, for example from hydroxy stearic acid, or the fat forming acids of hydrogenated castor oil. The term "estolide" as herein used is intended to cover the anhydro compounds formed from oxy acids.

As further set forth in this application and application, Serial No. 281,375, modifications of the resins may be produced by including in the reacting ingredients small amounts of rosin, fatty acids of linseed oil, etc., which added materials have a desirable effect on the resinifying reactions employed.

Serial No. 284,277 is particularly directed to the wax-like fat forming acid complexes, for example a stearic phthalic glyceride wax, which wax-like products may be produced by the employment of sufficient stearic acid, or other fat forming acid, to yield the softer wax-like products.

The present invention is particularly directed to the production of such synthetic resins as those referred to above, which will exhibit quick drying properties, that is resins which in solution in volatile solvents have the property of parting readily with the solvent on exposure in thin layers, yielding a coating which becomes dust free and hard in a comparatively short period of time.

The invention further contemplates the treatment of resins of the stearic acid type to enhance their rapid drying properties.

The invention is more particularly illustrated by the detailed description given below, but it should be understood that this more detailed description is given by way of illustration only, and not as limiting, since various changes therein may be made by those skilled in the art without departing from the scope and spirit of the present invention. And while, as stated, the present invention is more particularly concerned with the treatment of the true resins of the fat acid type, the application of the invention to the treatment of other resins of the glyceride type is included.

In coating compositions and especially those of the lacquer type, a desirable feature is that of quick drying, by which term is meant that the solvent employed to dissolve the resin to produce the coating composition escapes freely, particularly the last portions thereof, which, if retained, cause a long period of tackiness. The stearic acids made by the heating methods referred to may not be as normally quick drying in the relative sense contemplated in the lacquer field as may be desired. The experimental work indicates that there is formed in the production of such resins a small proportion of a substance or mixture of substances which hinder the rapid escape of the last portions of the volatile solvents employed. In accordance with the present invention such stearic or analogous resins are treated to free them from such substance or substances, so that drying of the coating will take place rapidly, corresponding in general rate to that which is observed in the case of many of the natural resins. However, the explanation offered is not to be considered as a limitation, since enhancement of the drying properties of the resins is obtained by the methods herein set forth, regardless of what the theoretical explanation may be.

The resins to be treated may be converted into quick drying resins by treatment with or extraction of the resin with solvents. The materials which hinder the evaporation of solvents as stated above, and which materials may be present in these resins are thus removed, due to their solubility in the solvents employed, in which solvents the resin itself is only slightly soluble, or substantially insoluble.

A considerable range of solvent bodies are available for the purpose, some of which are more suitable than others in the commercial treatment of the resin or for various reasons lend themselves to a refining procedure of this character. A number of petroleum solvents may be used advantageously, including casing head naphtha, gasoline, special distillates of petroleum naphtha, kerosene, etc. Certain alcohols, neutral or slightly alkaline and the like may also be employed in some cases. The extraction step may be carried out in various ways, as for example by heating the resin to a temperature above its melting point and agitating with an extraction vehicle, such as kerosene. On the other hand, the resin may be pulverized and extracted in the cold with such solvents as casing head naphtha or gasoline. The following examples will illustrate the production of resins that may be further treated in accordance with the present invention to produce quick drying complexes:

Example 1

Such a resin may be made for example as follows: stearic acid (triple pressed natural acid or a product of hydrogenation) 84 parts, phthalic anhydride 148 parts, glycerol 93 parts are mixed and heated to 250° C. for one hour. The proportions of the constituents may be varied to produce a particular type of resin desired.

Example 2

Japan wax 88 parts and glycerol 18.4 parts are heated together at 250° C. under a reflux condenser for five hours. At the end of this time 65 parts glycerol and 148 parts of phthalic anhydride are added and the heating at 250° C. maintained for one hour.

Example 3

Hydrogenated oil 48—49 titre may be substituted for the japan wax of Example 2, the same parts by weight being utilized. This example illustrates a resin produced from a hydrogenated fat.

The resins produced in accordance with the examples given above or modified to produce the fat forming acid resins referred to in the co-pending applications, may be treated to produce rapidly drying stearic resins by various methods illustrated in the examples set forth below:

Example 4

Seventy parts by weight of a glycerol-phthalic-stearic resin were heated to 110°–125° C. with about 180 parts by weight of kerosene, with stirring and kneading. The agitation was stopped and the supernatant liquid decanted. The resin retained, at this stage, a considerable quantity of kerosene. Seventy-five parts of fresh kerosene were added and the process repeated. The resin-kerosene mixture weighed 125. The decanted kerosene of the first operation, on cooling, deposited a substance of the consistency of a hard fat. The second lot of decanted kerosene became turbid but deposited very little. This extracted matter was about 7% of the original resin. The resin-kerosene mass, under high pressure, gave a cake containing about ⅓ of its weight of kerosene. Most of this was removed by heating to 190° C.

Dissolved in a solvent consisting of toluol 4, butyl acetate 4, normal butanol 1, all parts by weight, both the press cake and the heated product yielded films drying very much more rapidly than those given by the original resin.

Example 5

An extraction was made with technique similar to that described under Example 4, but using petroleum naphtha (95° C.–168° C.) instead of kerosene.

Extract. The extracted matter constituted more than 3% of the original resin. It resembled the substance deposited by the kerosene in Example 4: acid number 26, saponification number 230.5, melting point 39°–41° C.

Extracted resin. The resin held more than its own weight of naphtha. A sample dissolved in an equal part by weight of the previously described solvent gave a film drying hard in 15 minutes. Another sample was dried to constant weight, and dissolved: It gave a film drying less rapidly than the resin containing naphtha but much more quickly than the original resin.

Example 6

The same resin as used in Examples 4 and 5 was ground with an equal weight of gasoline (boiling between 95° C. and 168° C.) at room temperature: The gasoline was filtered off and the resin washed with gasoline at 40° C. A sample of the product was roughly dried and weighed and heated to constant weight: the quantity of gasoline thus driven off was 60% of the weight of the sample.

The remainder was pressed and the press cake broken up and exposed to the air for several days. At the end of this it was found to lose 1.4% of its weight on heating to constant weight at 125° C. The press cake and the heated product, dissolved as before described, both gave rapidly drying films.

Example 7

An experiment was made similar to that described in Example 5, but using 95% ethyl alcohol instead of naphtha. The treatment removed about 6% of the complex. The treated resin, dissolved as before described, gave a film drying more rapidly than that made from the original resin.

Example 8

An experiment was made similar to that described in Example 5, substituting water containing potassium carbonate (37 milligrams of $K_2CO_3$ to each gram of resin) for the extracting agent and pure water for the washing agent. After removal of the water by heat, the resin was dissolved as above described and the solution gave a film drying more rapidly than one made with the original resin.

Example 9

An experiment was made similar in technique to Example 4, using tung oil instead of kerosene. No second treatment was given. The oil and resin were allowed to stand for several hours at 120° C. The solid residue freed from oil by breaking up and draining was found to weigh 26.3% more than the original resin.

Part of this was heated to 160° C. and allowed to cool slowly.

Part was pressed at 4000 lbs. to the square inch.

Both, dissolved as before described, gave films drying more rapidly than one made with the original resin.

These quick drying resins are particularly valuable in the production of lacquers, of which the following is exemplary:

*Example 10*

Three hundred and thirty parts of the treated resin is dissolved with the aid of heat in three hundred and thirty parts by weight of a solvent mixture composed of toluol and secondary butyl acetate in equal parts, and to this are added four hundred and ten parts of a 20% solution of ½ second nitrocellulose in the solvent, and the mixture then thinned by the addition of five hundred and sixty parts of the same solvent.

Other ingredients such as pigments, solvents, thinners, softeners and plasticizers may be incorporated or substituted, as the case may be for those mentioned in the example. For example, dibutyl phthalate may be added as a plasticizer to the composition given above using seventy parts by weight in the particular example given.

The treated resins having quick drying properties may be utilized with other cellulose compounds, such as acetate and the ethers in the production of coating compositions, and the quick drying resins may also be used without cellulose derivatives in the production of satisfactory coating materials. In addition, the treated resins will harden more readily under heat treatment with or without pressure into less soluble, less fusible materials, and accordingly the treated resins may be heat treated with or without pressure, and either with or without the addition of cellulose derivatives, such as nitrocellulose, to produce the less soluble, less fusible materials. The heat treatment may be applied to the coatings deposited from the solutions to produce baked or otherwise heat-treated finishes. In view of the fact that the treated resins harden more readily under heat treatment, they may be used for coatings which are subsequently baked in order to produce hardened coatings, and such baking operations may be applied both to coatings of the resins themselves and to coatings produced from the resins with additional materials, such as nitrocellulose, other cellulose esters and ethers, plasticizers, fillers, etc. Similarly, these treated resins may be used as a basis for plastic compositions which are subsequently hardened by heat treatment methods with or without pressure.

The residues recovered from the solvents and which represent the material extracted by such solvents from the initially treated resins may be utilized in various ways, and may, for example, be added to the mixtures of substances utilized in the production of the initial types of resins.

Having thus set forth my invention, I claim:

1. The process of producing rapidly drying resins which comprises forming a synthetic glyceride type resin containing rapid and slow drying ingredients, and removing the slow drying ingredients by treating the reaction resin with a solvent for the slow drying ingredients that exhibits not more than slight solvent action on the remainder of the resin.

2. The process of producing rapidly drying resins which comprises forming a stearic phthalic glyceride resin containing slow drying ingredients, and removing the slow drying ingredients by treating the reaction resin with a solvent for the slow drying ingredients that exhibits not more than slight solvent action on the remainder of the resin.

3. The process of producing rapidly drying resins which comprises forming a synthetic fat-forming saturated acid glyceride type resin containing rapid and slow drying ingredients, and treating the re-action resin with a solvent for the slow drying ingredients that exhibits not more than slight solvent action on the remainder of the resin.

4. The process of producing rapidly drying resins which comprises forming a synthetic stearic glyceride type resin containing rapid and slow drying ingredients and treating the resin with a solvent for the slow drying ingredients, that is a substantial non-solvent for the rapid drying ingredients.

5. In the process of producing rapidly drying resins from synthetic glyceride type resins containing both rapid and slow drying ingredients, the step of treating such resins with a solvent for the slow drying ingredients, that is a substantial non-solvent for the remainder of the resin.

6. The process of producing rapidly drying resins, which comprises forming a synthetic fat forming saturated acid glyceride type resin containing rapid and slow drying ingredients, treating the resin with a solvent for the slow drying constituents that exhibit not more than slight solvent action on the remainder of the resin, removing the solvent carrying the extracted ingredients and drying the remaining resin.

7. A slow drying hard fat like body separated from a stearic phthalic glyceride resin by extraction with a solvent for the said body which is not more than a slight solvent for the resin.

8. The synthetic resin resulting from the process of claim 1.

9. The synthetic resin resulting from the process of claim 2.

10. The synthetic resin resulting from the process of claim 6.

In testimony whereof, I have hereunto subscribed my name this 10th day of March, 1930.

CARLETON ELLIS.